United States Patent Office 2,828,288
Patented Mar. 25, 1958

2,828,288

WATER-SOLUBLE DICYANDIAMIDE-FORMALDEHYDE CONDENSATES

Karl Taube, Leverkusen-Bayerwerk, Walther Benade, Leverkusen, and Otto Weber, Opladen, Germany, assignors to Farbenfabriken Bayer Aktiengesellschaft, Leverkusen, Germany, a corporation of Germany No Drawing. Application May 18, 1955
Serial No. 509,417

In Germany October 31, 1949

Public Law 619, August 23, 1954
Patent expires October 31, 1969

2 Claims. (Cl. 260—69)

The present invention refers to dyeings and prints of water-soluble dyestuffs; more particularly, it concerns a composition for the improvement of the fastness properties of said dyeings and prints.

According to the present invention a new composition, especially suitable for improving the wet fastness properties of dyeings and prints produced with direct dyeing dyestuffs on cellulosic materials, is obtained by condensing in aqueous medium 1 mol of dicyandiamide with 0.75 to 1.5 mol of formaldehyde in the presence of 0.33 to 0.75 mol of hydrogen chloride at a temperature up to 100°, preferably between 30° C. and 100° C., evaporating the water and heating the condensation product formed to a temperature above 100° C., preferably between 120° C. and 160° C.

For the purpose of improving the fastness properties of dyeings and prints the latter are treated with the new composition by conventional methods. Instead of applying the new composition as such it is within the scope of the invention to use the composition in combination with a copper salt, for instance copper sulfate. As compared with the new composition as such, said combination leads to a considerable improvement of the fastness to light apart from an increased improvement of the fastness to wet processing.

The new composition is distinctly superior to the previously known dicyandiamide-formaldehyde-condensation products as regards their properties improving the fastness of dyeings and prints.

The invention is further illustrated by the following example.

Example 84 g. (=1 mol) of dicyandiamide are suspended in 200 cc. of distilled water; 18.2 g. of hydrogen chloride (=0.5 mol) in the form of an approximately 10 normal hydrochloric acid and 75 cc. (=1 mol) of aqueous 40% formaldehyde solution are added at room temperature. Thereupon the mixture is heated to boiling while stirring. After the solution has become neutral, it is filtered with charcoal, rapidly cooled to 40° C. and evaporated to dryness in vacuo. The colorless condensation product obtained, which is clearly water-soluble and brittle in the cold, is then heated to 150° C. for three hours. A pulverulent product is obtained which is still water-soluble. Dyeings of substantive dyestuffs which are treated with an aqueous solution of this product are fast to water, washing and sweating.

We claim:
1. A composition of matter obtained by condensing in aqueous medium 1 mol of dicyandiamide with 0.75 to 1.5 mol of formaldehyde in the presence of 0.33 to 0.75 mol of hydrogen chloride at a temperature up to 100° C., evaporating the water and heating the condensation product formed to a temperature from above 100° C. to 160° C.

2. A composition of matter comprising the reaction product of claim 1 and a copper salt.

References Cited in the file of this patent

FOREIGN PATENTS

| 323,665 | Germany | Apr. 20, 1919 |
| 325,647 | Germany | Apr. 19, 1934 |
| 833,708 | Germany | Mar. 10, 1952 |

OTHER REFERENCES

Yampol'skaya, Chemical Abstracts, vol. 37, 1943, column 1273 (7).